UNITED STATES PATENT OFFICE.

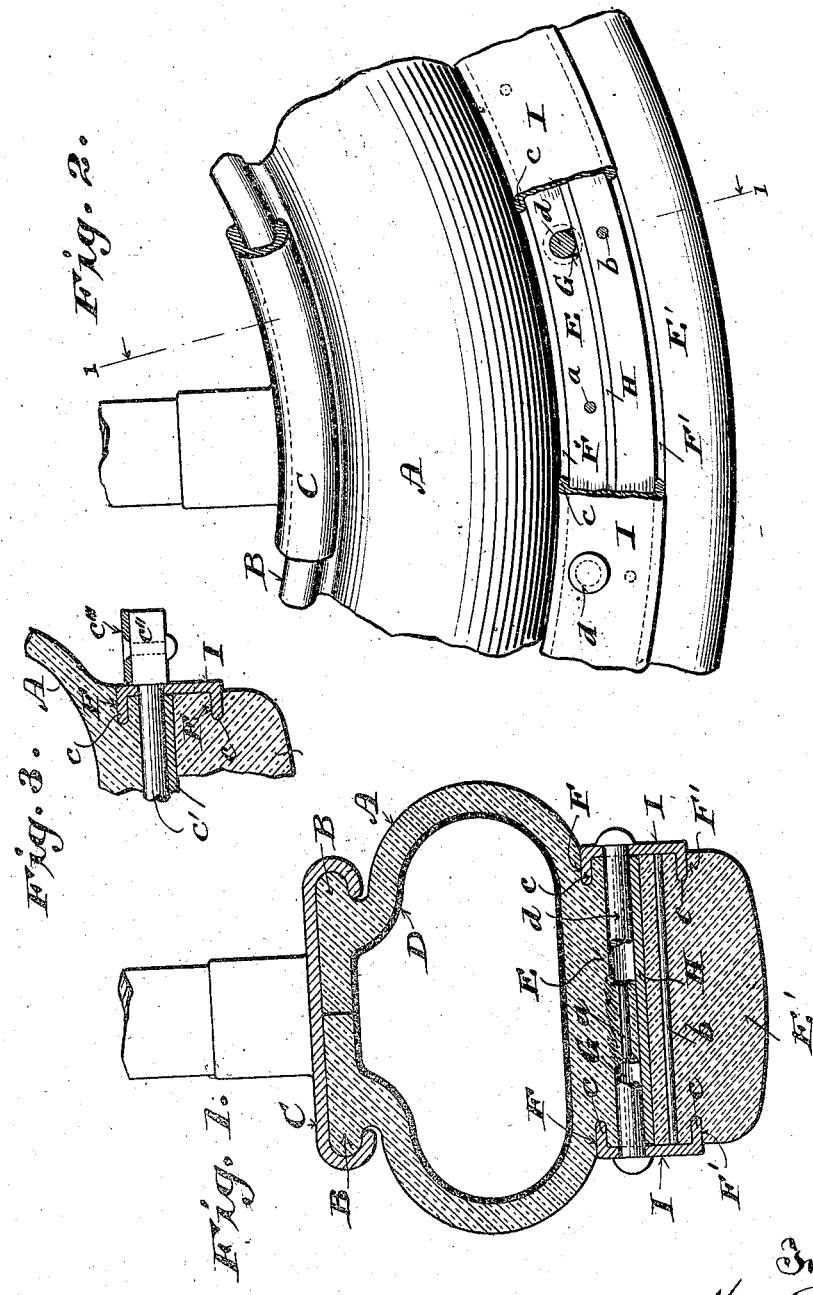

MARY B. PRIEST, OF MILWAUKEE, WISCONSIN, ASSIGNOR TO THE PRIEST TIRE COMPANY, A CORPORATION OF WISCONSIN.

PNEUMATIC VEHICLE-TIRE.

No. 885,647.

Specification of Letters Patent.

Patented April 21, 1908.

Application filed May 20, 1907. Serial No. 374,567.

*To all whom it may concern:*

Be it known that I, MARY B. PRIEST, a citizen of the United States, and resident of Milwaukee, in the county of Milwaukee and State of Wisconsin, have invented certain new and useful Improvements in Pneumatic Vehicle-Tires; and I do hereby declare that the following is a full, clear, and exact description thereof.

The object of my invention is to provide a non-puncturable pneumatic-tire for vehicles, the construction and arrangement being such, that by a combination of rubber and metallic-rings the tread or shoe-portion of the tire, when striking an obstruction will be displaced in its entirety with relation to the wheel-rim, the rigidity of the tread thus formed, renders the supporting area of the load upon said tire approximately half its diameter, in place of a few inches, as is the case with pneumatic-tires having the commonly constructed soft treads, thus making it possible to dispense with the high air-pressures required in sustaining a load necessary wherein soft tread tires are used.

The invention therefore consists in various peculiarities of construction and combination of parts as hereinafter fully set forth with reference to the accompanying drawings and subsequently claimed.

In the drawings: Figure 1 represents a cross-section of a tire embodying the features of my invention, the tire being formed with beads adaptable to attachment to rims of the clencher type, the section being indicated by line 1—1 of Fig. 2; Fig. 2, an elevation of a portion of the same with parts broken away and parts in section to better illustrate the invention, and Fig. 3, a detail cross-section of a portion of the tire illustrating means for protecting the edges of said tire against puncture.

Referring by letter to the drawings, A indicates a one-piece pneumatic tire-casing formed preferably with a greater width than height, the side-walls of which tire-casing are semi-circular. The inner-face of the one-piece tire-casing is flattened and has projecting beads B, which beads are fitted into the inturned edges of a metal-rim C, and held therein by the usual method of stay-bolts (not shown), the said tire-casing being split for the insertion of the usual inner-tube D.

The outer-face of the tire-casing is provided with a flat-tread E, over which is fitted a metallic-band H, serving the double purpose of adding rigidity and preventing puncture of the air-compartment. The tread is further provided with annular grooves F, and a series of cross-grooves G, together with cross-wires *a* embedded therein at intervals throughout the circumference of said tread, the cross-wires terminating flush with the edges thereof.

A thick pliable shoe E' composed of rubber is adjusted to the metallic-band, which shoe is provided with annular side-grooves F' similar to those of the tread and likewise cross-wires *b*, the latter together with those of said tread serving to stiffen the parts.

The shoe together with the metallic-band is held against lateral motion by means of metal side-rings I, which rings have inturned flanges *c* adapted to fit the annular grooves of the casing-tread and outer shoe, said rings being clamped to the sides of the respective parts by bolts *d* that pass through the cross-grooves G, snugly fitting the space between the bottom of said grooves and inner-face of the metallic shoe. The bolts, as shown, are upset against the vertical outer faces of the side-rings I, serving to thus hold the assembled parts securely together, said rings practically transforming the tread-portion of the tire into a rigid ring adapted to yield in its entirety in a vertical direction with relation to the wheel-rim proper through the medium of interposed air carried by the flexible portion of said tire.

From the foregoing description it will be seen that the rings I overlap the joint between the tread-portion of the casing proper, metallic band and outer rubber shoe, and thereby effectually seal said joint against the entrance of any foreign matter. The flanges *c* which are nested in the grooves of the tread and shoe also add materially to effecting this result.

The detail illustrated in Fig. 3, shows one of a clamping-bolts *c'* provided with projecting beads *c''*, to which beads is secured a guard-ring *c'''*, the purpose of which is to protect the sides of the tire-casing from puncture, it being understood that a similar construction is carried out upon the opposite side not shown.

I claim:

In a pneumatic vehicle-tire comprising a one-piece tubular casing, having flexible side-walls, a flattened split-base, and an outer flat tread extension; the combination of a metallic-band fitted to the flat tread extension, a pliable annular shoe fitted over the band, metallic clamping-rings fitted to the sides of the shoe and said flat tread extension, and securing bolts connecting the rings.

In testimony that I claim the foregoing I have hereunto set my hand at Milwaukee, in the county of Milwaukee and State of Wisconsin in the presence of two witnesses.

MARY B. PRIEST.

Witnesses:
 GEO. W. YOUNG,
 GEORGE FELBER.